United States Patent
Troesch et al.

(10) Patent No.: US 11,610,446 B2
(45) Date of Patent: Mar. 21, 2023

(54) ACCESS CONTROL SYSTEM AND METHOD FOR OPERATING AN ACCESS CONTROL SYSTEM

(71) Applicant: Inventio AG, Hergiswil (CH)

(72) Inventors: Florian Troesch, Erlenbach (CH); Armin Wittneben, Zürich (CH); Gregor Dumphart, Zürich (CH); Marc Kuhn, Gockhausen (CH)

(73) Assignee: INVENTIO AG, Hergiswil (CH)

( * ) Notice: Subject to any disclaimer, the term of this patent is extended or adjusted under 35 U.S.C. 154(b) by 171 days.

(21) Appl. No.: 17/309,006

(22) PCT Filed: Oct. 3, 2019

(86) PCT No.: PCT/EP2019/076814
§ 371 (c)(1),
(2) Date: Apr. 12, 2021

(87) PCT Pub. No.: WO2020/074359
PCT Pub. Date: Apr. 16, 2020

(65) Prior Publication Data
US 2021/0383629 A1    Dec. 9, 2021

(30) Foreign Application Priority Data

Oct. 12, 2018  (EP) .................................. 18200002

(51) Int. Cl.
*G07C 9/28* (2020.01)
*G07C 9/27* (2020.01)
(Continued)

(52) U.S. Cl.
CPC .......... *G07C 9/28* (2020.01); *G07C 9/00309* (2013.01); *G07C 9/10* (2020.01); *G07C 9/27* (2020.01);
(Continued)

(58) Field of Classification Search
None
See application file for complete search history.

(56) References Cited

U.S. PATENT DOCUMENTS 6,161,018 A       12/2000  Reed et al.
9,794,753 B1 *  10/2017  Stitt .................... G06F 21/35
(Continued)

FOREIGN PATENT DOCUMENTS

CN          1292204 A       4/2001
CN        101320092 A      12/2008
(Continued)

*Primary Examiner* — K. Wong
(74) *Attorney, Agent, or Firm* — William J. Clemens; Shumaker, Loop & Kendrick, LLP

(57) ABSTRACT

A system for controlling access to an access-restricted zone in a building includes a transmitting device transmitting a first radio signal, a receiving device for radio signals, a control device and a signal processing device communicatively connected to the receiving and control devices. The signal processing device determines a first channel impulse response based on the first radio signal received by the receiving device and a second channel impulse response based on a second radio signal received by the receiving device. The second radio signal is transmitted from a first mobile electronic device of a first user. The signal processing device determines a degree of similarity by evaluating the first and second channel impulse responses. The degree of similarity indicates how similar the first and second channel impulse responses are to one another. The control device initiates a building action if the degree of similarity meets a specified rule.

17 Claims, 5 Drawing Sheets

(51) Int. Cl.
*G07C 9/10* (2020.01)
*G07C 9/00* (2020.01)
*G06N 20/00* (2019.01)

(52) U.S. Cl.
CPC ... *G06N 20/00* (2019.01); *G07C 2009/00341* (2013.01); *G07C 2009/00793* (2013.01); *G07C 2209/08* (2013.01); *G07C 2209/64* (2013.01)

(56) References Cited

U.S. PATENT DOCUMENTS

| | | |
|---|---|---|
| 10,785,650 B2 | 9/2020 | Dutz et al. |
| 10,989,790 B2 | 4/2021 | Jo |
| 2016/0018508 A1 | 1/2016 | Chen |
| 2016/0249316 A1 | 8/2016 | Kudekar |

FOREIGN PATENT DOCUMENTS

| | | |
|---|---|---|
| CN | 101435867 A | 5/2009 |
| CN | 108027416 A | 5/2018 |
| CN | 108540160 A | 9/2018 |
| EP | 2934052 A1 | 10/2015 |
| EP | 2893367 B1 | 2/2018 |
| EP | 3370464 A1 | 9/2018 |
| WO | 03069799 A2 | 8/2003 |
| WO | 2010112586 A1 | 10/2010 |
| WO | 2015023464 A1 | 2/2015 |
| WO | 2015135630 A1 | 9/2015 |
| WO | 2016198548 A1 | 12/2016 |
| WO | 2017100706 A1 | 6/2017 |
| WO | 2018037728 A1 | 3/2018 |

\* cited by examiner

ACCESS CONTROL SYSTEM AND METHOD FOR OPERATING AN ACCESS CONTROL SYSTEM

FIELD

The technology described herein relates, in general, to an access control system that grants an authorized user access to an access-restricted zone in a building or site. Exemplary embodiments of the technology relate, in particular, to an access control system having a transceiver device for radio signals and to a method for operating such an access control system.

BACKGROUND

Access control systems may be configured in a variety of different ways. The embodiments may relate, for example, to the way in which users (persons) must identify themselves as authorized to access, for example, with a key, a magnetic card, a chip card or an RFID card or with a mobile electronic device (for example, mobile phone). WO 2010/112586 A1 describes an access control system, in which a mobile phone carried by a user sends an identification code to an access node. If the identification code is recognized as valid, the access node sends an access code to the mobile phone, which displays the access node on a display. If the user holds the mobile phone to a camera so that the camera is able to detect the displayed access code, the access control system checks whether the detected access code is valid. If the code is valid, the user is granted access.

In buildings with many floors, there may be a high volume of traffic at certain times of the day, for example in an entrance hall of an office building when a large number of employees enter the building in the morning or after a lunch break to arrive at their workplaces. At these times, high demands are placed not only on the efficiency of an elevator system installed in the building, but also on the access control system in order, for example, to avoid as much as possible lines forming in front of an access. There is therefore a need for an access control system that fulfills these requirements, wherein the access control is nevertheless able to reliably distinguish persons having access authorization from persons who are not authorized.

SUMMARY

One aspect of such a technology relates to a method of operating an access control system to control access to an access-restricted zone in a building. The system comprises a control device, a stationary transmitting device for a first radio signal, a receiving device for radio signals and a signal processing device communicatively connected to the receiving device. In the method, the signal processing device determines a first channel impulse response based on the first radio signal received by the receiving device. The signal processing device also determines a second channel impulse response based on a second radio signal received by the receiving device. The second radio signal is transmitted from a first mobile electronic device of a first user. The signal processing device also determines a degree of similarity by evaluating the first channel impulse response and the second channel impulse response. The degree of similarity indicates how similar the first channel impulse response and the second channel impulse response are to one another. If a specified rule is met based on the degree of similarity, the control device initiates a building action. The radio signals have a bandwidth of at least 500 MHz and are transmitted and received according to a WLAN/WiFi standard or a standard for ultra-broadband technology.

Another aspect of the technology relates to a system for controlling access to an access-restricted area in a building. The system comprises a transmitting device for transmitting a first radio signal, a receiving device for radio signals, a control device and a signal processing device, which is communicatively connected to the receiving device and the control device. The signal processing device determines a first channel impulse response based on a first radio signal received by the receiving device and a second channel impulse response based on a second radio signal received by the receiving device. The second radio signal is transmitted from a first mobile electronic device of a first user. The signal processing device also determines a degree of similarity by evaluating the first channel impulse response and the second channel impulse response. The degree of similarity indicates how similar the first channel impulse response and the second channel impulse response are to one another. The control device initiates a building action if a specified rule is met based on the degree of similarity. The radio signals have a bandwidth of at least 500 MHz and are transmitted and received according to a WLAN/WiFi standard or a standard for ultra-broadband technology.

The technology described herein creates an access control system which, based on an evaluation of the radio signals, recognizes that a user is not only in the building, but also actually desires a certain building action. This is done in a convenient way for the user because the user is not required to handle the mobile electronic device, for example. In addition to such an advantage discernible to a user, the technology described herein also offers significant technical advantages.

According to the technology described herein, the degree of similarity is based on an evaluation of the channel impulse responses. A first sequence of temporally successive first multipath signal components is determined from the first channel impulse response, and a second sequence of temporally successive second multipath signal components is determined from the second channel impulse response. The evaluation of the first and second channel impulse responses includes a pairwise comparison, in one exemplary embodiment according to the sequence in the first and second sequences, of every second multipath signal component with its first multipath signal component corresponding to the sequence. From this, a time deviation is determined for each pair, so that there is a maximum time deviation and a minimum time deviation, a definition of the degree of similarity being based on at least one of these time deviations. The technology described herein therefore makes targeted use of the multipath signal propagation, which is often viewed as disadvantageous.

Since the multipath signal propagation is used in a targeted manner, the technology described herein may also be used when there is no visual contact with the receiving device. The technology described herein is therefore also suitable for use in buildings in which a high density of users may occur. Such a user density may arise, for example, when there is a high volume of traffic in an entrance hall of an office building or hotel.

The technology described herein also has the advantage that it can be used with both synchronous and asynchronous radio signals. In one exemplary embodiment for a synchronous situation, the first radio signal and the second radio signal have a common time reference. A first distance of the first mobile electronic device of the first user from the transmission device is ascertained according to $$d_1 = E_S \cdot c \cdot SD_S,$$

where: c is the speed of light, $E_S=(K+1)/K$ (correction factor) and $SD_S=\max\{|\Delta_1|, \ldots, |\Delta_K|\}$ (degree of similarity in a synchronous situation). If the first distance is shorter than or equal to a specified minimum distance, the building action is initiated.

In one exemplary embodiment for an asynchronous situation, the first radio signal and the second radio signal do not have a common time reference. A first distance of the first mobile electronic device of the first user from the transmitting device is ascertained according to $$d_1 = E_A \cdot c/2 \cdot SD_A,$$

where: c is the speed of light, $E_A=(K+1)/(K-1)$ (correction factor) and $SD_A=(\max\{\Delta_1, \ldots, \Delta_K\}-\min\{\Delta_1, \ldots, \Delta_K\})$ (degree of similarity in an asynchronous situation). If the first distance is shorter than or equal to a specified minimum distance, the building action is initiated.

As mentioned above, the technology described herein may also be used with more than one user, for example, when there is a high volume of traffic. In such a situation, the receiving device receives a number of additional radio signals, which are transmitted by a number of additional mobile electronic devices. On the basis of each received additional radio signal, a channel impulse response is determined, which is evaluated in conjunction with the first channel impulse response in order to determine a distance between the corresponding additional mobile electronic device and the transmitting device. For each ascertained distance, it is checked whether it is shorter than or equal to the specified minimum distance. In this way, even in situations with more than one user, the user who is closest to the transmitting device may be recognized.

If, in a situation including several users, one of the ascertained distances is shorter than or equal to the specified minimum distance, the building action is initiated for the user of the corresponding mobile electronic device to which a corresponding channel impulse response is assigned. In such a situation it may occur that an authorized or unauthorized user attempts to join the user for whom the building action is initiated at this point in time, and thus to enter the restricted-access zone. The technology described herein may also be used to detect such a pushy situation. For this purpose, at least one further degree of similarity is determined based on the corresponding channel impulse response and a channel impulse response that is assigned to a radio signal from a further mobile electronic device. On the basis of this, a device distance between the corresponding mobile electronic device and the further mobile electronic device is ascertained. If the device distance is shorter than or equal to a specified device distance, a safety measure is initiated. The security measure may include triggering an alarm and/or alerting security personnel.

In situations including multiple users, some or all of these users may belong together and as such form a group. The technology described herein also enables such a group to be recognized. For this purpose, channel impulse responses are evaluated, which are each assigned to a radio signal from a further mobile electronic device, the evaluation comprising calculating degrees of similarity in pairs in order to ascertain distances between the mobile electronic devices. The distances are compared with a specified user distance. If the mobile electronic devices are each at a distance from one another that is shorter than or equal to the specified user distance, the corresponding users are then assigned to a single group. In this case, security personnel may, for example, also be alerted in order to channel the users of this group together through the entrance, in order to keep the group together and to keep delays as low as possible.

The technology described herein may also be used in conjunction with a machine learning algorithm. For this purpose, the signal processing device has, among other things, a storage device in which a measurement database and a computer program are stored. The measurement database stores a data set, which is determined in a training phase and which comprises a plurality of measured distances of a mobile electronic device from the transmitting device and channel impulse responses measured for each of the measured distances. In the training phase, the computer program executes a machine learning algorithm in order to ascertain a function from the data sets that maps the measured channel impulse responses to the measured distances. In an application phase, the function ascertained in the training phase is applied to the first and second channel impulse responses, in order to ascertain therefrom a distance between the mobile electronic device and the transmitting device.

Known standards for radio communication may be used in the technology described herein. The radio signals have a bandwidth of at least 500 MHz and are transmitted and received according to a WLAN/WiFi standard or a standard for ultra-broadband technology. Examples of such standards are indicated elsewhere in this specification.

In one exemplary embodiment, a first identifier is used to determine the building action. If the first user has access authorization, the first identifier is assigned to a user profile in which a user-specific building action is stored. The first identifier is ascertained in conjunction with the second radio signal. The building action may, for example, involve initiating an elevator call (destination call) for the user or opening doors or other barriers to which this user has access authorization.

Another advantage of the technology described herein is that the transmitting device has a limited range of functions with little complexity; in one exemplary embodiment, the range of functions is limited to a periodic transmission of a broadband training sequence and of the identifier. The transmission device is therefore relatively inexpensive. If several transmission devices are to be situated in one zone in order, for example, to improve the accuracy of the distance determination, this may also be done relatively inexpensively.

DESCRIPTION OF THE DRAWINGS

Various aspects of the improved technology are described in greater detail below with reference to exemplary embodiments in conjunction with the drawings. In the figures, identical elements have identical reference numerals, in which.

DETAILED DESCRIPTION

Figure 1:
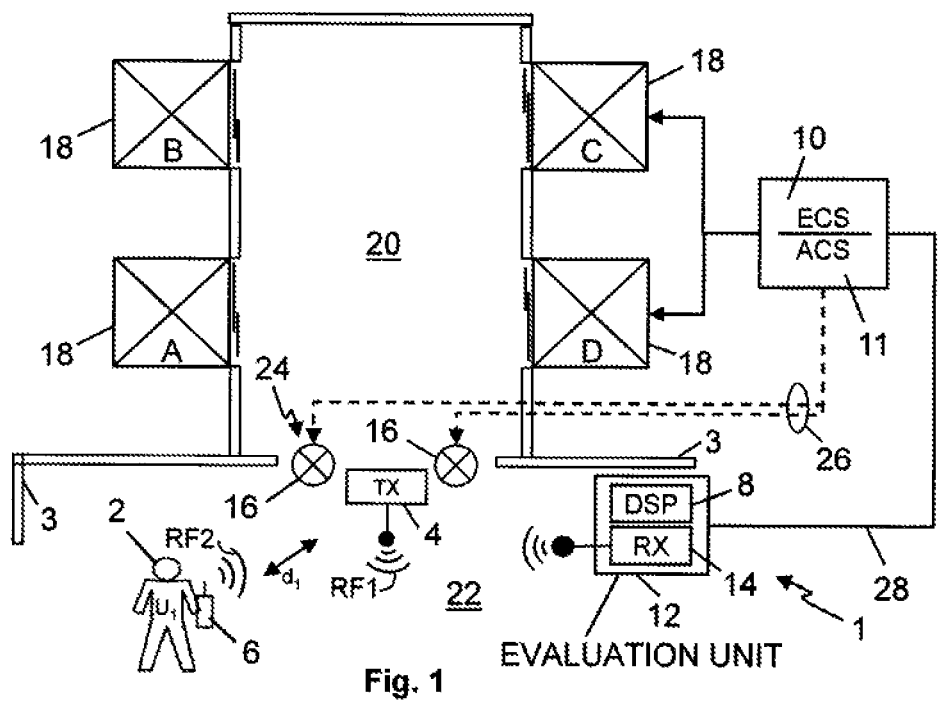
FIG. 1 shows a schematic representation of an exemplary situation in a building having an access control system according to a first exemplary embodiment.
Figure 2:
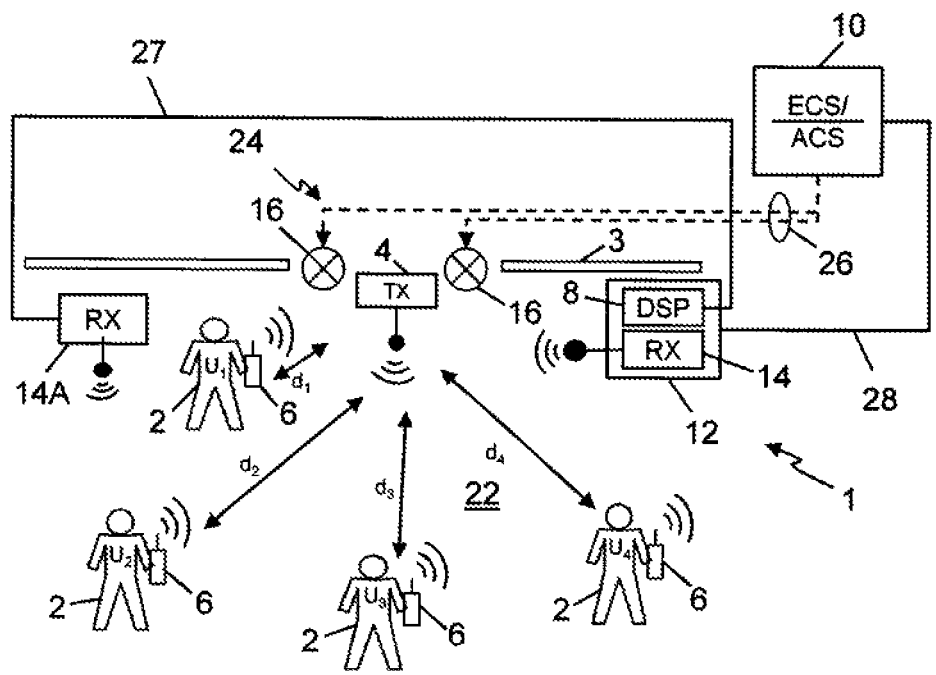
FIG. 2 shows a schematic representation of a second exemplary embodiment of an access control system.

FIG. 1 and FIG. 2 are schematic representations of exemplary situations in a building having an access control system 1. For purposes of illustration, only a few walls 3, rooms 18 and zones 20, 22 of the building are shown. The rooms 18 may, for example, be offices, apartments, halls and/or elevator cars of an elevator system. A user 2 ($U_1$), who is carrying a mobile electronic device 6 (also referred to below as mobile device 6), is located in the zone 22 in the situation shown in FIG. 1. The mobile device 6 emits a radio signal RF2. In the situation shown in FIG. 2, a large number of users 2 ($U_1$, $U_2$, $U_3$, $U_4$) are located in the zone 22. The zone 22 is not subject to access restriction in these exemplary situations and is also referred to below as public zone 22. An access 24 separates the public zone 22 from the zone 20, which is subject to an access restriction and adjoins the rooms 18. Zone 20 is also referred to below as access-restricted zone 20. The term "building" in this description is to be understood to mean, for example, residential and/or commercial buildings, sports arenas and airports, ships also being viewed as structures similar to buildings.

According to one exemplary embodiment, the access control system 1 comprises a transmitting device 4 (shown as TX) for a radio signal RF1, a receiving device 14 (shown as RX) for radio signals RF1, RF2, a signal processing device 8 (shown as DSP) connected to the receiving device 14 and a controller 11 (shown as ACS). The receiving device 14 and the signal processing device 8 may be arranged in an evaluation unit 12 which is connected to the controller 11 of the access control system 1 by a wired and/or wireless connection 28.

In FIG. 2, the application example shown in FIG. 1 is modified in that it comprises a further receiving device 14A. The receiving device 14A is connected to the signal processing device 8 of the evaluation unit 12 by means of a wired and/or wireless connection 27. The receiving device 14A is optional, but it may potentially be advantageous in the technology described herein, as explained elsewhere in this description. Additional components and functionalities of the access control system 1 according to FIG. 1 and FIG. 2 are mentioned elsewhere in this description.

In the situations shown in FIG. 1 and FIG. 2, the technology described herein may be advantageously used to operate the access control system 1 with as little complexity as possible, and to afford the user 2 convenient access to the access-restricted zone 20. Summarized briefly and by way of example, the access control system 1 according to one exemplary embodiment is operated as follows: The technology recognizes the user 2 who is so close to the entrance 24 that a specified minimum distance to the entrance 24 is not reached. This falling short of the minimum distance is interpreted as the desire of the user 2 to want to enter the access-restricted zone 20 at this point in time. For this purpose, the technology evaluates radio signals RF1, RF2, which are transmitted by the transmitter 4 and the mobile device 6 of the user 2 in order on the basis thereof to obtain distinguishable channel impulse responses ($h(\tau)$). Since the sources of these radio signals (i.e., the transmitter 4 and the mobile device 6) are relatively close to one another in the same environment (public zone 22), the radio signals propagate on similar paths (for example, due to reflections on walls 3 and other effects). For this reason, channel impulse responses ($h(\tau)$) result which are all the more similar the closer the mobile device 6 is to the transmitting device 4. The technology described herein utilizes this and determines a degree of similarity from the channel impulse responses, which indicates how similar the channel impulse responses are. If a specified rule is met based on the degree of similarity, a building action is initiated. The determination of the degree of similarity and its application for a distance determination are explained in conjunction with FIG. 3A-FIG. 3F.

The radio components of the access control system 1 (i.e., the receiving device 14, 14A and the transmitting device 4) are situated in the public zone 22 in the exemplary embodiment shown. The transmitting device 4 is situated in the entrance 24 or in the vicinity thereof, and the receiving device 14 is situated at a location remote therefrom in the public zone 22. The user 2 waiting there is at a distance $d_1$ from the transmitter 4 in the situation shown. For each further user 2 ($U_2$, $U_3$, $U_4$) shown in FIG. 2, a momentary distance $d_2$, $d_3$, $d_4$ from the transmitter 4 and thus from the entrance 24 is also shown for illustration. The location of the receiving device 14 is selected so that it receives a radio signal emitted by the transmitting device 4 of sufficient signal strength, i.e., a radio signal has a signal strength at the location of the receiving device 14 (for example, expressed by an RSSI value (Received Signal Strength Indicator)), which is greater than a threshold value specified for a secure reception. The location of the receiving device 14A is selected in a corresponding manner.

An exemplary embodiment of the technology described herein is explained below with reference to the situation shown in FIG. 1. In one exemplary embodiment, the transmitting device 4 emits the radio signal RF1, which has a relatively high bandwidth, for example, greater than approximately 500 MHz, for example, between 1 GHz and 4 GHz. The bandwidth, characterized by a lower and an upper limit frequency, specifies the width of the frequency spectrum in between, in which the dominant frequency components of a signal to be transmitted are situated. The transmission device 4 transmits the radio signal RF1 in accordance with a standard for radio communication designed for this bandwidth, for example, in accordance with a (broadband) WLAN/WiFi standard (802.11ad) or a standard for ultra-broadband (ultra-wideband (UWB)) technology (IEEE 802.15.4a). The radio signal RF1 may also be emitted in accordance with the 5G standard or another or future standard for broadband radio communication.

In one exemplary embodiment, the transmission device 4 generates and transmits a training sequence with the radio signal RF1, which is emitted periodically or continuously.

The training sequence consists of predefined bit patterns so that the training sequence is characteristic of the transmission device 4; this allows the radio signal RF1 to be distinguished from other radio signals (for example, the radio signal RF2). In one exemplary embodiment, the radio signal RF1 can be assigned to the transmitting device 4 by means of the training sequence in a receiver. The training sequence may be, for example, an m-sequence (maximum length sequence), which may be generated, for example, by means of a shift register with a generator polynomial or by means of a computer program.

In one exemplary embodiment, the radio signal RF1 can be configured to transmit additional information in addition to the training sequence, for example, information about a location of the transmitting device 4 or a transmitter identifier that is assigned to the location in a database. The radio signal RF1 may also be provided to prompt the mobile device 6 to transmit a response signal, for example, to set the response signal in a defined temporal relationship to the radio signal RF1, for example, the response signal has a time offset to the radio signal RF1.

The receiving device 14 is compatible with the standard for radio communication according to which the transmitting device 4 transmits. The receiving device 14 is also designed to receive the broadband radio signal RF1 and to evaluate the training sequence. The receiving device 14 also receives the radio signal RF2 emitted by the mobile device 6 of the user 2 when the user 2 or the mobile device 6 is within radio range of the receiving device 14.

The mobile device 6 has a radio module which, in one exemplary embodiment, generates and transmits the radio signal RF2 in accordance with the standard for radio communication that is selected for the transmission device 4. Similar to the radio signal RF1, the radio signal RF2 is also broadband, i.e., the bandwidth is, for example, greater than approximately 500 MHz, for example, between 1 GHz and 4 GHz. In one exemplary embodiment, the radio module uses the radio signal RF2 to generate and send a training sequence, which is emitted periodically or continuously and which may be characteristic of the mobile device 6. In the exemplary embodiments of the technology described herein, the radio module of the mobile device 6 is activated when the user 2 is in the public zone 22. In the activated state, the mobile device 6 emits the radio signal RF2 continuously, for example; in one exemplary embodiment, it may be configured (programmed) in such a way that it emits the radio signal RF2 only after reception of the radio signal RF1 transmitted by the transmitting device 4, for example, as a response signal for synchronization purposes.

In one embodiment, the mobile device 6 may also be configured to transmit an identifier that allows the mobile device 6 to be assigned to the user 2 (as explained elsewhere in this description). The identifier may be transmitted with the radio signal RF2, for example, embedded therein and in accordance with the radio communication standard used for the radio signal RF2. The identifier may also be transmitted separately from the radio signal RF2, for example, using Bluetooth radio technology or a (possibly narrow-band) WLAN/WiFi radio technology; in this case, the selected radio technology is also implemented in the receiving device 14 so that the identifier may be received.

The mobile device 6 may, for example, have an application-specific software application (also referred to as an app), which is activatable by the user 2, for example. The application specific software application is used in one exemplary embodiment in conjunction with the access control and with the use of elevators. In one exemplary embodiment, the application-specific software controls the generation and transmission of the radio signal RF2. Depending on the configuration, this software may also generate the identifier of the mobile device 6, for example, an identifier that is unique to the mobile device 6 and remains changed over time. Such an identifier generated by software represents an alternative to a device identification number and to a telephone number, which may also be used as an identifier.

Figure 3A:
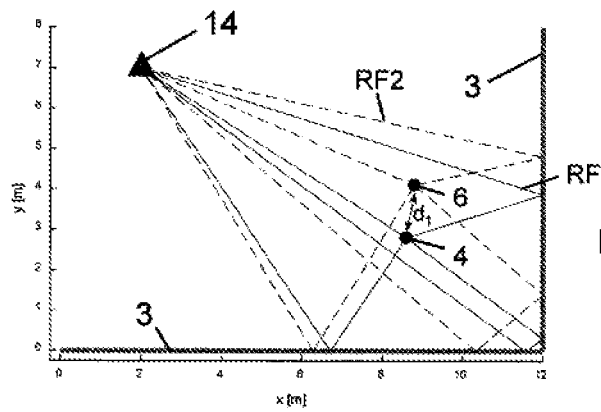
FIG. 3A shows a schematic representation of a multipath signal propagation between components that may occur in the situation according to FIG. 1.

The determination of the degree of similarity and its application for a distance determination are explained below in conjunction with FIG. 3A-FIG. 3F. FIG. 3A shows a schematic representation of multipath signal propagation based on radio signal sources (4, 6). In the situation according to FIG. 1, the radio signal sources correspond to the transmitting device 4 and the mobile device 6, which are separated from one another by a distance $d_1$. FIG. 3A also shows the receiving device 14 shown in FIG. 1, a wall 3 having two wall surfaces perpendicular to one another and an X-Y coordinate system.

The receiving device 14 receives the radio signals RF1, RF2 emitted by the mobile device 6 and the transmitting device 4. The radio signals RF1, RF2 propagate in space in all directions and are thereby more or less reflected, bent and/or scattered or otherwise influenced in their propagation at any obstacles and walls 3 that may be present. This is known to the person skilled in the art, for example, under the term "multipath propagation." For purposes of illustration, some of these signal paths are shown in FIG. 3A, solid lines representing the signal paths of the radio signal RF1 emitted by the transmitting device 4 and broken lines representing the signal paths of the radio signal RF2 emitted by the mobile device 6. The receiving device 14 receives, for example, the radio signal RF2 from the mobile device 6 in a direct way and in a variety of other ways. The receiving device 14 receives the radio signal RF1 from the transmitting device 4 in an analogous manner. The person skilled in the art recognizes that a direct reception is not always given because, for example, an obstacle (for example, a user 2) is located between the receiving device 14 and the transmitting device 4, and that in such a case the receiving device 14 only receives signals that propagate indirectly.

As explained above, the radio signals RF1, RF2 received by the receiving device 14 may be distinguished, in one exemplary embodiment, for example, due to different training sequences. If the training sequence is an m-sequence, then orthogonal m-sequences exist for certain lengths ($2^N$−1) of the bit sequences, by means of which multiple transmitters (here the transmitting device 4 and the mobile device 6) are able to transmit a training sequence to a receiver (here the receiving device 14) without causing interference. The radio signal RF2 of the mobile device 6 may also emit the identifier of the mobile device 6, so that it may be distinguished from the radio signal RF1, even if the radio signal RF1 itself includes no individual identifier. The receiving device 14 determines an associated channel impulse response $h_1(\tau)$, $h_2(\tau)$ for each radio signal RF1, RF2.

The person skilled in the art knows that the channel impulse response $h(\tau)$ is a description of the current linear transmission channel and, by definition, corresponds to the signal that may be determined at an output of the transmission channel if a Dirac pulse is supplied as an input signal at an input of the transmission channel. The channel impulse response describes the effect that the transmission channel has on the input signal, for example, as a function of time. Knowing the channel impulse response $h(\tau)$ improves decoding of received symbols in a receiver, for example; in some radio-based communication systems (for example, WLAN 802.11), the channel impulse response h(τ) is therefore estimated on the receiver side. The estimate of the channel impulse response h(τ) may be based on a received training sequence.

Figure 3C:
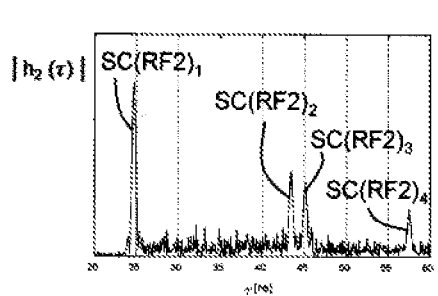
FIG. 3C shows a schematic representation of an exemplary second channel impulse response based on a second radio signal.
Figure 3B:
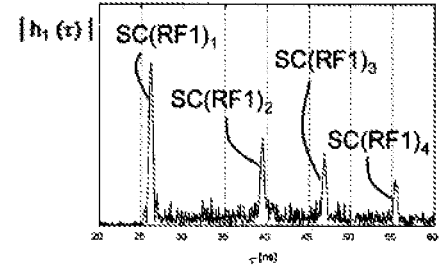
FIG. 3B shows a schematic representation of an exemplary first channel impulse response based on a first radio signal.

Based on the radio signal RF1 emitted by the transmitter 4, a first channel impulse response $h_1(\tau)$ may determined after reception by the receiving device 14; FIG. 3B shows a schematic illustration of an exemplary magnitude function $|h_1(\tau)|$ of the first channel impulse response $h_1(\tau)$ as a function of time in nanoseconds (ns). In this exemplary representation, the magnitude function $|h_1(\tau)|$ has four peak values at $\tau_1 \approx 26$ ns, $\tau_2 \approx 40$ ns, $\tau_3 \approx 47$ ns and $\tau_4 \approx 55$ ns; each of these peak values corresponds to a multipath signal component $SC(RF1)_k$ (k=1, 2, 3, 4) of the radio signal RF1, which is taken into account in the evaluation in this exemplary embodiment.

Based on the radio signal RF2 emitted by the mobile device 6, a second channel impulse response $h_2(\tau)$ may be determined after reception by the receiving device 14; FIG. 3C shows a schematic illustration of an exemplary magnitude function $|h_2(\tau)|$ of the second channel impulse response $h_2(\tau)$ as a function of time in nanoseconds (ns). In this exemplary representation, the magnitude function $|h_2(\tau)|$ has four peak values at $\tau_1 \approx 25$ ns, $\tau_2 \approx 43$ ns, $\tau_3 \approx 45$ ns and $\tau_4 \approx 58$ ns; each of these peak values corresponds to a multipath signal component $SC(RF2)_k$ (k=1, 2, 3, 4) of the radio signal RF2.

In one exemplary embodiment, the multipath signal components $SC(RF1)_1$, $SC(RF2)_1$ may each correspond to a signal component received on a direct radio path. The receiving device 14 thus has "line of sight" to the transmitting device 4 and to the mobile device 6. A person skilled in the art recognizes that depending on the currently prevailing situation (for example, there is an obstacle (for example, another user or part of the building) between the mobile device 6 and the receiving device 14) in the public zone 22, this line of sight cannot exist. In such a situation, at least one of these (first) multipath signal components $SC(RF1)_1$, $SC(RF2)_1$ may not occur. The technology described herein makes it possible to determine the degree of similarity in this situation as well.

The person skilled in the art also recognizes that the receiving device 14 and the signal processing device 8 are configured, for example, have a fixed reception bandwidth in order to resolve multiple multipath signal components $SC(RF1)_k$, $SC(RF2)_k$ in the radio signals RF1, RF2 so that they may be evaluated. As explained above, the respective bandwidth of the radio signals RF1, RF2 is greater than 500 MHz, and the reception width of the receiving device 14 must be determined accordingly. The higher the bandwidth of the radio signals RF1, RF2, the greater the distance between the signal components $SC(RF1)_k$, $SC(RF2)_k$ and the more accurately the signal components $SC(RF1)_k$, $SC(RF2)_k$ and their temporal difference may be evaluated. The person skilled in the art also recognizes that the number k of the multipath signal components $SC(RF1)_k$, $SC(RF2)_k$ is not limited to four.

Figure 3E:
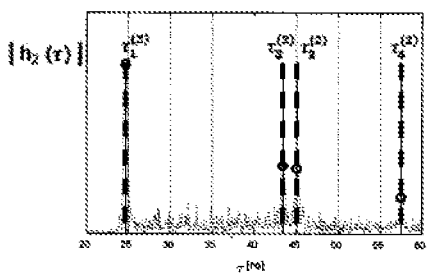
FIG. 3E shows a schematic representation of the second channel impulse response with peak values delineated by way of example.
Figure 3D:
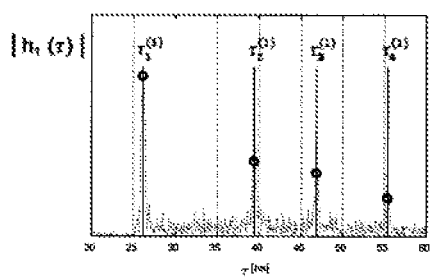
FIG. 3D shows a schematic representation of the first channel impulse response with peak values delineated by way of example.

The signal processing device 8 detects the multipath signal components $SC(RF1)_k$, $SC(RF2)_k$, the associated peak values and their temporal occurrence for each of the channel impulse responses $h_1(\tau)$, $h_2(\tau)$. This is illustrated in FIG. 3D and FIG. 3E. FIG. 3D is a schematic representation of the magnitude function $|h_1(\tau)|$ of the first channel impulse response $h_1(\tau)$ with the delineated exemplary four multipath signal components $SC(RF1)_k$, and FIG. 3E is a schematic representation of the magnitude function $|h_2(\tau)|$ of the second channel impulse response $h_2(\tau)$ with the delineated exemplary four multipath signal components $SC(RF2)_k$, in each case at the points in time $\tau_1, \tau_2, \tau_3, \tau_4$.

The temporal occurrence of the multipath signal components $SC(RF1)_k$, $SC(RF2)_k$ is extracted from the channel impulse responses $h_1(\tau)$, $h_2(\tau)$. For such an extraction process, the SAGE algorithm (Space-Alternating Generalized Expectation-Maximization) may be used in one exemplary embodiment, as described, for example, in: B. H. Fleury, et al., "Channel parameter estimation in mobile radio environments using the SAGE algorithm," IEEE Journal on selected areas in communications, Vol. 17, No. 3, pp. 434-450, 1999, and T. Santos, J. Karedal, P. Almers, F. Tufvesson, and A. Molisch, "Modeling the ultra wideband outdoor channel: Measurements and parameter extraction method," IEEE Transactions on Wireless Communications, Vol. 9, No. 1, pages 282-290, 2010.

From FIGS. 3B-3D it is apparent that the channel impulse responses $h_1(\tau)$, $h_2(\tau)$ are similar because the transmitter 4 and the mobile device 6 are relatively close to one another in the same environment (public zone 22). It follows here that the smaller the distance $d_1$, i.e., the closer the mobile device 6 is to the transmitting device 4, the more similar the channel impulse responses $h_1(\tau)$, $h_2(\tau)$ are. Conversely, i.e., as the distance $d_1$ increases, the similarity of the channel impulse responses $h_1(\tau)$, $h_2(\tau)$ increasingly decreases. In the situation shown in FIG. 1, the environment in which the transmitting device 4 and the mobile device 6 are located is relatively narrowly delimited, it is, for example, an entrance hall in a building. The similarity of the channel impulse responses $h_1(\tau)$, $h_2(\tau)$ is shown, for example, by the fact that (with line of sight) both have four recognizable protruding multipath signal components $SC(RF1)_k$, $SC(RF2)_k$, which occur at similar points in time $\tau_1, \tau_2, \tau_3, \tau_4$.

The multipath signal component $SC(RF1)_1$, $SC(RF2)_1$ (k=1) that occurs first in each case results from the radio signal RF1, RF2, which is received in a direct line of sight (for example, without reflecting on wall 3) by the receiving device 14. In the case of these multipath signal components $SC(RF1)_1$, $SC(RF2)_1$ (k=1) that appear first, the peak values are generally the highest. The peak values of the following multipath signal components $SC(RF1)_k$, $SC(RF2)_k$ (k=2, 3, 4) generally decrease in sequential order.

According to the technology described herein, the similarity of the channel impulse responses $h_1(\tau)$, $h_2(\tau)$ is used to determine a degree of similarity. The distance $d_1$ is determined based on the degree of similarity. To determine the degree of similarity, the multipath signal components $SC(RF1)_k$, $SC(RF2)_k$ (k=1, 2, 3, 4) in one embodiment are considered in pairs, i.e., the multipath signal components $SC(RF1)_1$ that appear first, $SC(RF2)_1$ (k=1) form a pair P1, and the multipath signal components $SC(RF1)_2$, $SC(RF2)_2$ (k=2) appearing next form a pair P2; the pairs P3 and P4 result accordingly.

Figure 3F:
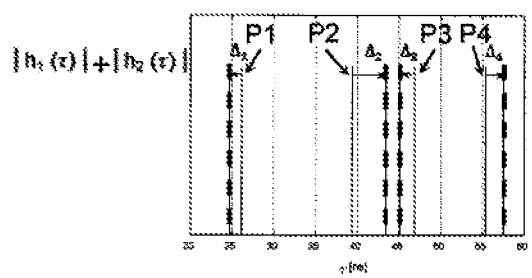
FIG. 3F shows a schematic representation of a superposition of the channel impulse responses shown in FIG. 3D and FIG. 3E.

FIG. 3F shows a schematic representation of a graphical overlay of the magnitude functions $|h_1(\tau)|$, $|h_2(\tau)|$ shown in FIG. 3D and FIG. 3E, with only the multipath signal components $SC(RF1)_k$, $SC(RF2)_k$ being shown. The aforementioned consideration of the multipath signal components $SC(RF1)_k$, $SC(RF2)_k$ in pairs is also illustrated in FIG. 3F. For each of the pairs P1-P4, a time difference $\Delta_k$ is shown, which indicates whether the respective multipath signal component $SC(RF2)_k$ of the second radio signal RF2 is received by the receiving device 14 before or after the corresponding multipath signal component $SC(RF1)_k$ of the first radio signal RF1. A sign of the time difference $\Delta_k$ indicates which signal component of a pair P1-P4 is received first.

The time differences $\Delta_k$ shown in FIG. 3F result for each pair P1-P4 from the equation $$\Delta_k = \tau^{RF2}_k - \tau^{RF1}_k$$

with k=1, . . . , K. When these time differences $\Delta_k$ are determined, the pair is determined for which the time difference $\Delta_k$ is the greatest, i.e., max $\{|\Delta_1|, \ldots, |\Delta_K|\}$. The maximum of the amount over all pairs is a measure of the similarity of the two channel impulse responses $h_1(\tau)$, $h_2(\tau)$; this measure is referred to as the degree of similarity.

For geometric reasons, the distance $d_1$ is limited, i.e., $$d_1 \geq c \cdot |\Delta_k|$$

for each k. The distance $d_1$ is determined using the equation $$d_1 = E_S \cdot c \cdot SD_S,$$

where: c is the speed of light, $E_S=(K+1)/K$ is a correction factor explained below and $SD_S=\max\{|\Delta_1|, \ldots, |\Delta_K|\}$ a degree of similarity with a common time reference.

In the previous explanations for determining the distance $d_1$, it is assumed that the radio signals RF1, RF2 have a common time reference, i.e., are synchronous with one another. This can be achieved, for example, by using high-precision clocks in the transmitting device 4, in the mobile device 6 and in the receiving device 14 and/or by means of so-called round-trip time protocols to synchronize wirelessly interconnected system components. An overview of such synchronization methods is provided, for example, by III-Keun Rhee, et al., "Clock Synchronization in Wireless Sensor Network: An Overview," Sensors 2009, Vol. 9, pp. 56-85).

For a very high number K of multipath signal components $SC(RF1)_k$, $SC(RF2)_k$, the correction factor $E_S$ approaches 1 in the case of synchronous radio signals RF1, RF2. $E_S=1$, the spacing is $d_1$ of $d_1=c \cdot \max\{|\Delta_1|, \ldots, |\Delta_K|\}$. With a relatively small number of K multipath signal components $SC(RF1)_k$, $SC(RF2)_k$, the correction factor $E_S=(K+1)/K$. In the exemplary embodiment described here with K=4, $E_S=5/4$.

The technology described herein may also be used when the radio signals RF1, RF2 have no common time reference, i.e., are asynchronous to one another. In this case, the distance $d_1$ results according to $$d_1 = E_A \cdot c/2 \cdot SD_A,$$

where: c is the speed of light, $E_A=(K+1)/(K-1)$ a correction factor described below and $SD_A=(\max \{\Delta_1, \ldots, \Delta_K\}-\min \{\Delta_1, \ldots, \Delta_K\})$ a degree of similarity with no common time reference.

Even in the case of asynchronous radio signals RF1, RF2, the correction factor $E_A$ approaches 1 for a very high number K of multipath signal components $SC(RF1)_k$, $SC(RF2)_k$. $E_A=1$ yields the distance $d_1$ from $d_1=c/2 \cdot (\max\{\Delta_1, \ldots, \Delta_K\}-\min \{\Delta_1 \ldots, \Delta_K\})$. With a relatively small number of K multipath signal components $SC(RF1)_k$, $SC(RF2)_k$, the correction factor is $E_A=(K+1)/(K-1)$. In the exemplary embodiment described here with K=4, $E_A=5/3$.

The access control system 1 uses distance $d_1$ thus determined in the situations shown in FIG. 1 and FIG. 2 in order to compare it with a specified minimum distance. Based on this comparison and on information about the access authorization of the user 2, for example, the identifier assigned to it, the access control system 1 controls the access 24 so that only authorized users 2 may enter the zone 20, for example, by blocking or releasing a door, a barrier, a turnstile, or another physical barrier or lock. In the case of accesses 24 without such physical barriers, the access control system 1 may, for example, control the access 24 by triggering a visual and/or an acoustic alarm when an unauthorized user is detected; alternatively or in addition, a notification of a security service may be initiated. Regardless of whether the access is equipped with or without a physical barrier, a potentially present information device may also be activated in order, for example, to inform a user. Two turnstiles 16 are delineated in FIG. 1 and FIG. 2 as exemplary physical barriers, which the controller (ACS) 11 of the access control system 1 controls by means of a wired and/or wireless connection 26.

In FIG. 1 and FIG. 2, components of the access control system 1 are situated in the access 24 or in the vicinity thereof for the purpose of illustration. Depending on the volume of traffic for which the access control system 1 is intended, the access 24 consists of several individual locks; for example, each of the two turnstiles 16 may represent a lock. The person skilled in the art recognizes that in a specific implementation the access control system 1 or its components can be arranged differently than shown in the figures. Each individual lock may, for example, represent an individual access at which a transmitting device 4 may be situated. The distance $d_1$ of the user 2 at this lock may be determined in relation to this transmission device 4.

The rooms 18 shown in FIG. 1 may, for example, belong to a group of elevators, which comprises, for example, four elevators (A-D) and is controlled by an elevator controller (ECS) 10. If a user 2 is at a distance $d_1$ at the access 24, which is shorter than the minimum distance, for example, this means in one exemplary embodiment that the user 2 wishes to be transported with one of the elevators to a destination floor specified for this user 2. According to one embodiment, such a transport represents a building action desired by user 2. When the user 2 is recognized, a destination call is initiated, to which the elevator controller 10 assigns an elevator (A-D) for a journey from a boarding floor to a destination floor. The assigned elevator (A-D) is communicated to the user 2, for example, by means of a display unit. In the situations shown in FIG. 1 and FIG. 2, each turnstile 16 may be assigned a display unit. If the user 2 uses one of the shown turnstiles 16, for example, the access control system 1 recognizes the turnstile 16 at which the user 2 is located and activates the display unit situated there in order to display the assigned elevator (for example, "A"). The person skilled in the art recognizes that the assigned elevator may be visibly and/or audibly communicated to the user 2.

Figure 4:
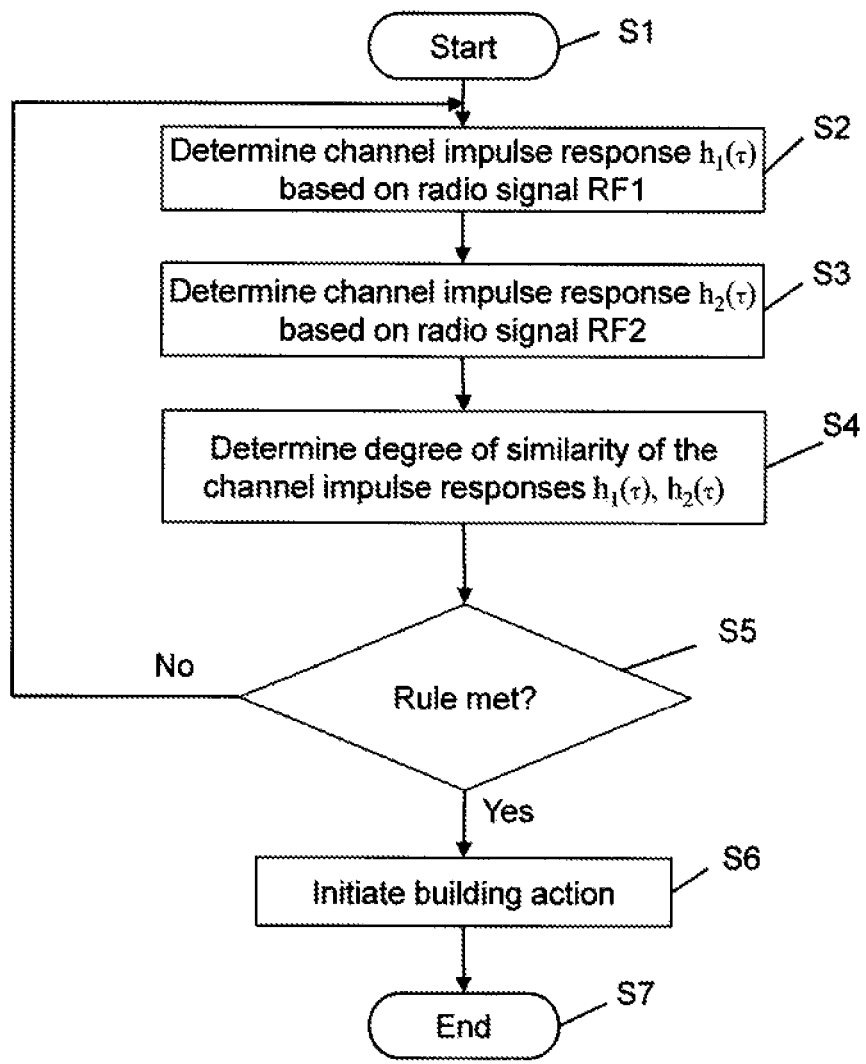
FIG. 4 shows a flowchart of an exemplary embodiment of a method for controlling access to an access-restricted zone.
Figure 5:
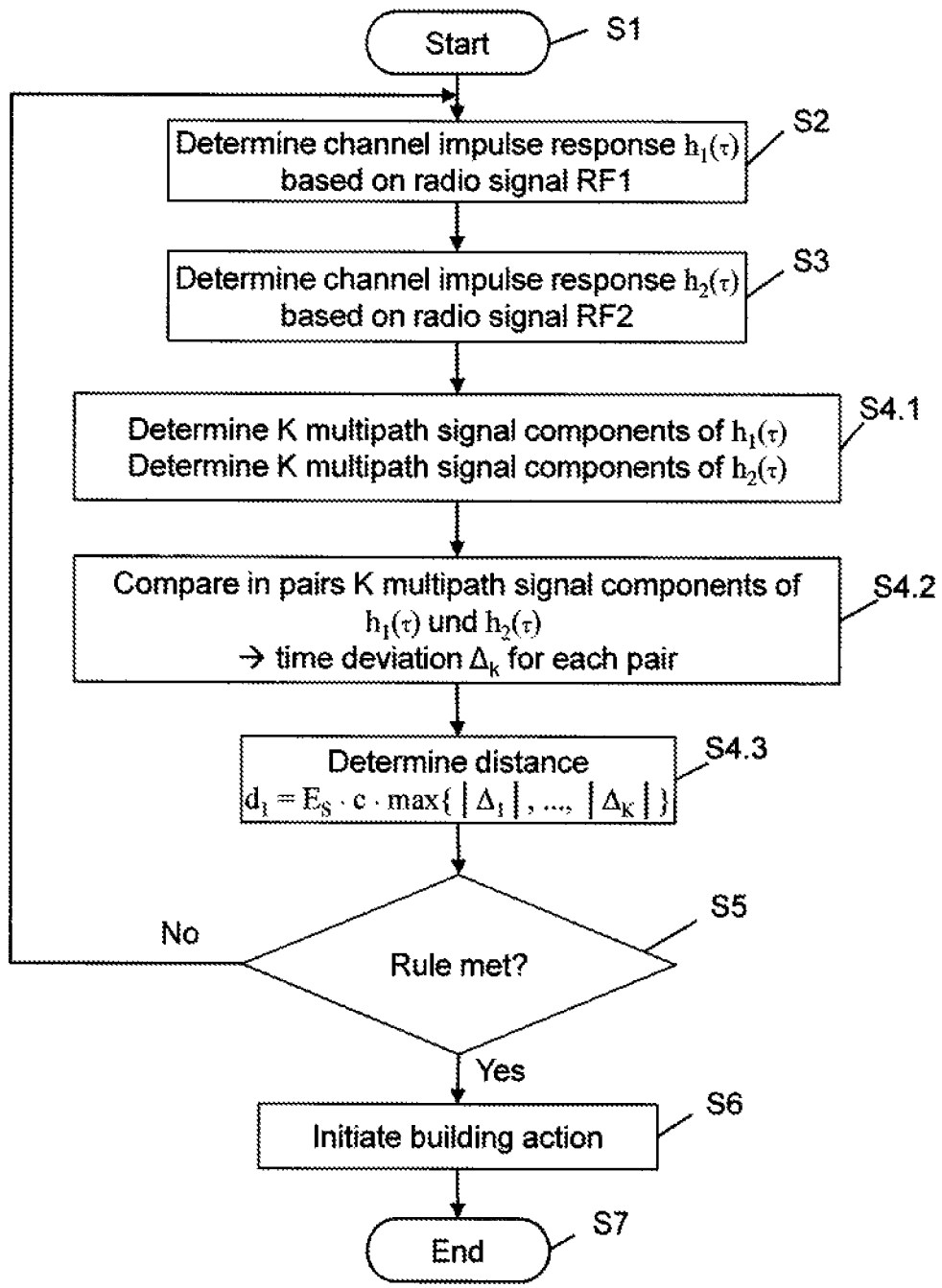
FIG. 5 shows a flowchart of a further exemplary embodiment of a method for controlling access to an access-restricted zone.

With an understanding of the basic system components described above and their functionalities, an exemplary method for operating the access control system 1 based on the situation shown in FIG. 1 (i.e., a single transmitting device 4 and a single user 2) is described below in conjunction with FIG. 4 and FIG. 5. FIG. 4 shows a simplified flowchart of the method, while FIG. 5 shows a flowchart including more detailed steps of the method.

The description is made with reference to a user 2 who desires to enter the access-restricted zone 20 at the access 24, for example, to use an elevator there. The user 2 carries the mobile device 6 on his/her person and has activated its radio module (for example, for broadband WLAN/WiFi or UWB communication). Any potentially associated software application is activated. The stationary transmitting device 4 is also activated and emits the radio signal RF1.

The method shown in FIG. 4 begins with a step S1 and ends with a step S7. The person skilled in the art recognizes that the division into these steps is exemplary and that one or more of these steps may be divided into one or more substeps or that several of the steps may be combined into one step.

In a step S2, the receiving device 14 receives the radio signal RF1 transmitted by the transmitting device 4, which transmits the training sequence assigned to the transmitting device 4. The signal processing device 8 determines a channel impulse response $h_1(\tau)$ based on the received radio signal RF1, as explained in conjunction with FIG. 3B.

If the user 2 with his/her mobile device 6 is in the public zone 22 and within radio range of the receiving device 14, the receiving device 14 receives in a step S3 a radio signal RF2 emitted by the mobile device 6, which transmits the training sequence assigned to the mobile device 6. The signal processing device 8 determines a channel impulse response $h_2(\tau)$ based on the received radio signal RF2, as explained in conjunction with FIG. 3C.

The mobile device 6 transmits the radio signal RF2, for example, in response to a received radio signal, which the transmitter 4 emits periodically, for example. This radio signal may be the radio signal RF1 or a separate radio signal for synchronization purposes. The radio signal RF2 includes a training sequence, as described above, by means of which the radio signal RF2 in the evaluation device 12 may be distinguished from the radio signal RF1. The mobile device 6 may also emit the radio signal RF2 independently of an external event or influence, for example, controlled by the software application.

The mobile device 6 may also emit an identifier of the mobile device 6, either embedded in the radio signal RF2 or as a separate radio signal, which is emitted according to a Bluetooth technology, for example. This identifier may be used to check whether it is assigned to a user 2 having access authorization in a database that includes a plurality of user profiles. The controller 11 of the access control system 1 may carry out this check, for example, immediately after the (first) reception of the identifier by the receiving device 14, even if the user 2 is only in the public zone 22 and does not yet want access at this point in time. The check may also only take place when the user 2 actually wants access, for example, when the user is very close to the access 24 or the transmitting device 14. In the exemplary embodiment described here, it is assumed that user 2 has access authorization and that a desired building action is initiated for him/her in a step S6.

In a step S4, the signal processing device 8 determines a degree of similarity by comparing the first and second channel impulse responses $h_1(\tau)$, $h_2(\tau)$. The degree of similarity (max $\{|\Delta_1|, \ldots, |\Delta_K|\}$) is determined according to the above equation $\Delta_k = \tau^{RF2}_k - \tau^{RF1}_k$. On the basis of this, the distance in the case of synchronous radio signals RF1, RF2 is determined according to $d_1 = E_S \cdot c \cdot \max\{|\Delta_1|, \ldots, |\Delta_K|\}$; in the case of asynchronous radio signals RF1, RF2, the distance is determined according to $d_1 = E_A \cdot c/2 \cdot (\max\{\Delta_1, \ldots, \Delta_K\} - \min\{\Delta_1, \ldots, \Delta_K\})$.

Based on the degree of similarity, it is checked in a step S5 whether a specified rule is met, i.e., it is checked whether the user 2 has access authorization and is located so close to the access 24 that the distance $d_1$ is shorter than or equal to the specified minimum distance. As explained above, reaching or falling short of the minimum distance is an indication that the user 2 wishes to carry out the desired building action at this point in time.

If the rule is met in step S5, the method proceeds along the yes branch to step S6 and the building action is initiated, as explained below. The method then ends in step S7. If, on the other hand, the rule is not met, the method proceeds back to step S2 along the no branch.

In one exemplary embodiment, the building action is specific for user 2 having access authorization and is located at access 24 at this point in time. The building action may, for example, involve triggering a destination call for user 2 (according to the data of the user profile existing for this user 2), assigning an elevator to this destination call and displaying the assigned elevator to user 2 at access 24. The building action may also involve unlocking one or multiple doors or releasing other barriers 16 to which this user 2 has access authorization. The person skilled in the art recognizes that these building actions may also be carried out in combination.

In one exemplary embodiment, the access control system 1 is connected to an elevator system, in particular, to the elevator controller 10 shown in FIG. 1 and FIG. 2. The communication between the access control system 1 and the elevator controller 10 may take place via an existing communication network in the building. For example, if the access control takes place in the entrance hall of the building through which users 2 must pass in order to arrive at the elevators, a destination call may be initiated with each access granted to the user 2 in question. The elevator controller 10 of the elevator system processes the destination call and assigns it an elevator (A-D in FIG. 1). The elevator assigned to the destination call may be displayed to the user 2, for example, by a terminal at the access 24 and/or may be voice-communicated. The user 2 may thus go directly to the assigned elevator without having to enter an elevator call.

Depending on the configuration of the building and the handling of the access authorizations, the access control system 1 may also grant visitors access and initiate building actions that are specified for the visitors. In conjunction with the elevator controller 10, a destination call may be generated for the visitor as a building action. The assigned elevator transports the visitor to the floor where the host is located. The floor of the host is stored, for example, in a visitor profile temporarily created for the visitor in conjunction with other invitation data (for example, date, time, host). The visitor, especially if they are in the building for the first time, therefore need not be concerned with inputting the destination floor. The visitor may also be provided more information to better orient themselves in the building, for example, the visitor may be advised in which direction (possibly also how far) they should go after getting off at the floor. The notification of such routing information may be done, for example, by means of the mobile device 6 of the visitor and/or displays on the floors or in the elevator car. In one exemplary embodiment, the access control system 1 generates and transmits a message to the host informing the host that the visitor has been granted access. The host may thus promptly prepare for the appearance of the visitor.

As mentioned above, FIG. 5 shows a flowchart including more detailed steps of the method according to one exemplary embodiment. In FIG. 5, step S4 shown in FIG. 4 is shown in greater detail by steps S4.1, S4.2, S4.3; steps S1-S3 and S5-S7 correspond to the steps shown in FIG. 4.

In step S4.1, the multipath signal components $SC(RF1)_k$, $SC(RF2)_k$ are ascertained for each channel impulse response $h_1(\tau)$, $h_2(\tau)$, as explained in conjunction with FIG. 3D and FIG. 3E. In the exemplary embodiment described here, four multipath signal components (K=4) each are ascertained.

In a step S4.2, the multipath signal components $SC(RF1)_k$, $SC(RF2)_k$ of the channel impulse responses $h_1(\tau)$, $h_2(\tau)$ are compared in pairs. From this comparison, the time difference $\Delta_k = T^{RF2}_k - T^{RF1}_k$ is determined for each pair P1-P4 as explained in conjunction with FIG. 3F.

In a step S4.3, the current distance $d_1$ of the mobile device 6 to the transmitter 4 or to the access 24 is determined. The person skilled in the art selects the appropriate equation for calculating the distance $d_1$ depending on whether the radio signals RF1, RF2 are synchronous or asynchronous, i.e., $d_1 = E_S \cdot c \cdot \max\{|\Delta_1|, \ldots, |\Delta_K|\}$ for synchronous radio signals RF1, RF2, and $d_1 = E_A \cdot c/2 \cdot (\max\{\Delta_1, \ldots, \Delta_K\} - \min\{\Delta_1, \ldots, \Delta_K\})$ for asynchronous radio signals RF1, RF2. The subsequent check as to whether the distance $d_1$ thus determined is shorter than or equal to the specified minimum distance takes place as described in step S5.

In contrast to the situation shown in FIG. 1, multiple users 2 ($U_1$, $U_2$, $U_3$, $U_4$) may be in the public zone 22 according to the situation shown in FIG. 2. Each of these users 2 carries a mobile device 6 on his/her person which, as described above, transmits a radio signal according to the radio technology used in the building. The receiving device 14 therefore receives a plurality of additional radio signals. For each of the radio signals a further channel impulse response is determined, which is compared with the first channel impulse response $h_1(\tau)$ in order to determine a distance $d_1$, $d_2$, $d_3$, $d_4$ of the respective electrical device 6 to the transmitting device 4. This makes it possible to identify which user 2 ($U_1$, $U_2$, $U_3$, $U_4$) is closest to the transmitter 4, and whether and when the distance $d_1$, $d_2$, $d_3$, $d_4$ ascertained for this user 2 is shorter than or equal to the specified minimum distance and, if this is the case, which building action is to be carried out for this user 2.

As mentioned above, the receiving device 14A in one exemplary embodiment is present in addition to the receiving device 14 and is connected to the signal processing device 8, as shown in FIG. 2. The receiving device 14A is situated in such a way that it receives the radio signal RF1 from the transmitting device 4. If the mobile device 6 is within reception range of the receiving device 14A, the latter also receives the radio signal RF2 transmitted by the mobile device 6.

The signal processing device 8 thus processes channel impulse responses, which are based on the reception of the radio signals RF1, RF2 by the receiving device 14A. The processing includes the pairwise determination of time differences $\Delta_k$ according to $\Delta_k = \tau^{RF2}_k - \tau^{RF1}_k$, described in conjunction with FIG. 3F. The signal processing device 8 also processes the channel impulse responses based on the reception of the radio signals RF1, RF2 by the receiving device 14 in order to determine time differences $\Delta_k$. From the total of these time differences $\Delta_k$, i.e., based on the reception by the receiving devices 14, 14A, the pair is determined for which the time difference $\Delta_k$ is the greatest, i.e., $\max\{|\Delta_1|, \ldots, |\Delta_K|\}$. The further processing to determine the distance takes place as described above. One advantage of using the additional receiving device 14A is that it improves the accuracy of the distance determination.

Exceptional situations may arise in buildings and situations that are similar, for example, to the situations shown in FIG. 1 and FIG. 2. A potentially unauthorized user may follow an authorized user 2, who has already been granted access, so closely that this user, like a free rider, may enter the access-restricted zone 20 potentially undetected. At the turnstile (16) shown in FIG. 1, which is used to isolate users, the unauthorized user may possibly push his/her way through behind the authorized user. Another exceptional situation may arise if users belonging to a group want access to the zone 20. The users of this group may, for example, be channeled jointly through access 24 in order to keep delays as minimal as possible. The technology described herein may also be advantageously used for these exceptional situations.

The technology described herein recognizes, for example, a free-rider or pusher situation. By means of the approach described in conjunction with FIG. 3F, the technology determines the user 2 who is the shortest distance $d_1$ from the transmission device 4. This user 2 has access authorization, for example, so that the desired building action may be initiated if the distance $d_1$ is shorter than or equal to the minimum distance. In order to recognize whether another user is very close to user 2, i.e., a distance between user 2 and the (pushy) user is shorter than or equal to a limit value, the approach described above for determining the time differences $\Delta_k$ uses a different reference. That is, the channel impulse response $h_1(\tau)$, which is based on the radio signal RF1 of the transmitter 4, is replaced by the channel impulse response $h_2(\tau)$, which is based on the radio signal RF2 that the mobile device 6 of the (authorized) user 2 emits, and used as the reference for determining the time differences $\Delta_k$.

With the channel impulse response $h_2(\tau)$ as a reference, the degree of similarity is determined for each additional radio signal; the closer another mobile device of another user is to the mobile device 6 of the authorized user 2, the more similar are the corresponding channel impulse responses. The determination of the distance between each additional user and (authorized) user 2 takes place as described above. If a distance determined in this way is smaller than the limit value, it is assumed that the corresponding user is a pusher. In this case, the access control system 1 may, for example, initiate a security measure. The security measure may include triggering an alarm and/or alerting security personnel.

The technology described herein also recognizes when several users are standing relatively close together and form a group. The recognition is based on the fact that a defined limit value for groups has been reached or fallen short of, for example, because the users know each other. This group may, for example, be apart from other users who may be present. Similar to the free rider or pusher situation described, the recognition of a group situation is based on the determination of inter-user distances, i.e., distances that exist between the users. In one exemplary embodiment, the distance $d_1$ to the transmitting device 4 is determined for each user by means of the approach described in conjunction with FIG. 3F. In this case, the channel impulse response $h_1(\tau)$ based on the radio signal RF1 is the reference. From these distance values it may, for example, be determined which user of the transmitting device 4 is closest. To determine the distances between users, pairs of channel impulse responses based on radio signals transmitted by mobile devices are analyzed. In each of these pairs, one of the two channel impulse responses is used as a reference. This results in a plurality of (inter-user) distance values. From the evaluation of these distance values it may be recognized whether and which users are close to one another. These users are assigned to the group. The access control system 1 may also initiate a security measure in this situation, for example, requesting security personnel to channel the users in the group through together.

Figure 6:
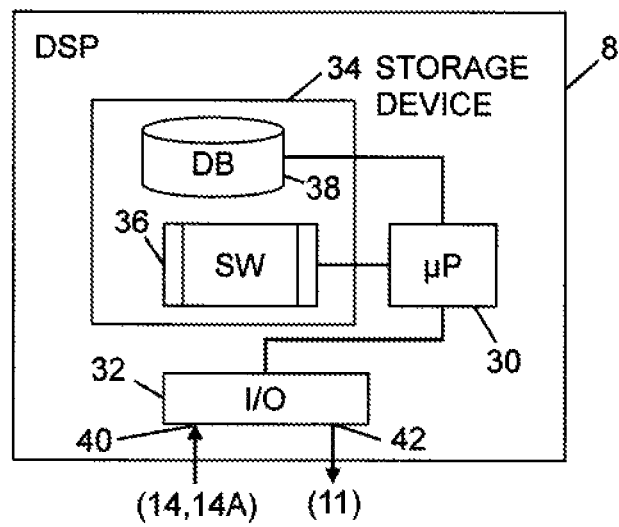
FIG. 6 shows a schematic representation of an exemplary embodiment of a signal processing device of the access control system shown in FIG. 1 and FIG. 2.

FIG. 6 is a schematic illustration of one exemplary embodiment of the signal processing device 8 of the access control system 1 shown in FIG. 1 and FIG. 2. The signal processing device 8 comprises a processor unit 30, a storage device 34 and an interface device 32 having a signal input 40 and a signal output 42. The storage device 34 is configured to store a measurement database 38 and a computer program 36. The processor unit 30 is communicatively connected to the storage device 34 in order to access the measurement database 38 and the computer program 36 according to the technology described herein. The processor unit 30 is also communicatively connected to the interface device 32 in order to receive signals from the receiving device 14, 14A via a signal input 40 of the interface device 32 and to transmit signals to the controller 11 of the access control system 1 via a signal output 42 of the interface device 32.

In one exemplary embodiment, the signal processing device 8 is configured to use the technology described herein in conjunction with one or more machine learning algorithms (also referred to as machine learning), with the aim of determining a degree of similarity or a distance. The computer program 36 is programmed accordingly in order to execute the algorithm or algorithms in conjunction with the processor unit 30. During execution, the processor unit 30 or the computer program 36 accesses one or multiple data records stored in the measurement database 38.

Machine learning algorithms typically consist of a training phase and a deployment phase. Examples of applications of these phases are described below based on the situations shown in FIG. 1 and FIG. 2; however, the training phase involves test situations without specific users, with one or more mobile devices 6 being positionable in sequence at n positions (n=1 ... N). The transmitting device 4 transmits the radio signal RF1 and the mobile device 6 transmits the radio signal RF2.

In the training phase, the mobile device 6 is situated at a first position, at this first position the distance $d^{(n)}$ to the transmitter 4 is measured and the resulting channel impulse responses $h_1^{(n)}(\tau)$, $h_2^{(n)}(\tau)$ are determined. If, as shown in FIG. 2, a second receiving device 14A is used, the distance $d^{(n)}$ to the transmitting device 4 is also measured, however, in addition to the channel impulse responses $h_{1,1}^{(n)}(\tau)$ ascertained with respect to the (first) transmitting device 4, $h_{2,1}^{(n)}(\tau)$, the channel impulse responses $h_{1,2}^{(n)}(\tau)$, $h_{2,2}^{(n)}(\tau)$ are also ascertained, which result with respect to the (second) receiving device 14A. The mobile device 6 is then placed in a new position and the process described is repeated, i.e., the distance $d^{(n)}$ is measured and the channel impulse responses $h_1^{(n)}(\tau)$, $h_2^{(n)}(\tau)$ (or $h_{1,1}^{(n)}(\tau)$, $h_{2,1}^{(n)}(\tau)$, $h_{1,2}^{(n)}(\tau)$, $h_{2,2}^{(n)}(\tau)$) are determined.

The distances $d^{(n)}$ measured in this way and the associated channel impulse responses $h_1^{(n)}(\tau)$, $h_2^{(n)}(\tau)$ are stored as a data set in the measurement database 38. In one exemplary embodiment, the channel impulse responses $h_1^{(n)}(\tau)$, $h_2^{(n)}(\tau)$ are processed to form a vector $X^{(n)}$, either by stringing together the time-discrete measured values, stringing together extracted time differences and peak values (see FIG. 3B-FIG. 3F) or a stringing both together. The computer program 36 executes, for example, a (machine learning) algorithm for regression, for example, a neural network, in order to train from the vector $X^{(n)}$ and the distances $d^{(n)}$ a mapping function f: $X \rightarrow d$.

In the deployment phase, i.e., when the distance between the user 2 and the transmitting device 4 is to be determined, the mapping function f: $X \rightarrow d$ determined in the training phase is applied. As described above, the channel impulse responses $h_1(\tau)$, $h_2(\tau)$ are continuously determined and processed to form a vector X using the same method as in the training phase. The mapping function f: $X \rightarrow d$ is used to determine the distance: $d = f(X)$.

The identifier of the mobile device 6 of an access-authorized user 2 mentioned in the preceding exemplary embodiments, or the identifiers of other access-authorized users, may be stored in one exemplary embodiment in a storage device of the access control system 1. The person skilled in the art recognizes that the number of users 2 present in the public zone 22 varies with time and that the storage device is updated when a mobile device 6 is no longer within radio range, for example, because the associated user 2 has left the public zone 22 without desiring access to the access-restricted zone 20 or because the associated user 2 has already entered the access-restricted zone 20. The storage device thus stores data sets for users 2 who are present in the public zone 22 at a specific point in time. The access system 1 therefore "knows" how many mobile devices 6 are located within radio range at a particular point in time and, if their users 2 are registered users 2 for the building, to which users 2 the mobile devices 6 belong. At this point in time, the access control system 1 is able to check for each registered user 2 which rights are specified for the user 2 in the building.

For each registered user 2, a user profile is created in the access control system 1, i.e., it is stored as a data set in a database. The user profile includes personal data of user 2 (for example, name, reason for authorization (resident, employee, external service provider, visitor)), access authorizations (for example, certain rooms 18 and floors) and any time restrictions (for example, access from Monday to Friday, from 7:00 a.m. to 8:00 p.m.). In the user profile, the user 2 is also assigned at least one mobile device 6. As an alternative to creating the user profile in the access control system 1, the user profile may be created in a database of a building management system, the access control system 1 being capable of accessing this database by means of a communication network.

The mobile device 6 may be, for example, a mobile phone, a smartphone, a tablet PC or a smartwatch, these devices usually being equipped with hardware that enables radio communication. However, the mobile device 6 may also be miniature computer goggles or another body-worn computer-aided device (also referred to as a "wearable device"). Depending on the configuration of the mobile device 6, it may, for example, have a graphical user interface (also referred to as Graphical User Interface, GUI) in order to be able to selectively activate and deactivate the mobile device 6 and its functions.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for operating a system for controlling access to an access-restricted zone in a building, the system including a control device, a stationary transmitting device transmitting a first radio signal, a receiving device for receiving radio signals and a signal processing device communicatively connected to the receiving device, the method comprising the steps of:
   determining, using the signal processing device, a first channel impulse response based on the first radio signal received by the receiving device;
   determining, using the signal processing device, a second channel impulse response based on a second radio signal received by the receiving device, the second radio signal being transmitted from a first mobile electronic device of a first user;
   determining, using the signal processing device, a degree of similarity by evaluating the first channel impulse response and the second channel impulse response, the degree of similarity indicating how similar the first channel impulse response and the second channel impulse response are to one another;

wherein the first and second radio signals have a bandwidth of at least 500 MHz and are transmitted and received according to a WLAN/WiFi standard or a standard for ultra-broadband technology; and initiating a building action in the building using the control device when a specified rule is met based on the degree of similarity.

2. The method according to claim 1 including a step of ascertaining a first identifier of the first mobile electronic device from the second radio signal, the first identifier being assigned to a user profile when the first user is authorized to access the access-restricted zone and a user-specific building action being stored in the user profile.

3. The method according to claim 1 wherein the building action involves at least one of releasing a barrier to which the first user has access authorization and registering a destination call to a destination floor specified for the first user.

4. The method according to claim 1 including the steps of:
ascertaining from the first channel impulse response a first sequence of temporally successive first multipath signal components;
ascertaining from the second channel impulse response a second sequence of temporally successive second multipath signal components; and
wherein the evaluating of the first and second channel impulse responses includes comparing in pairs, according to an order in the first and second sequences, every one of the second multipath signal components to a one of the first multipath signal components corresponding to the order to determine a time deviation for each of the pairs to obtain a maximum time deviation and a minimum time deviation, the degree of similarity being based on at least one of the maximum and minimum time deviations.

5. The method according to claim 4 wherein the first radio signal and the second radio signal have a common time reference, the method further including the steps of:
ascertaining a first distance of the first mobile electronic device of the first user from the transmitting device according to a formula $d_1 = E_S \cdot c \cdot SD_S$ where $E_S = (K+1)/K$ is a correction factor with K being a number of the multipath signal components, c is the speed of light and $SD_S$ is the maximum time deviation with a common time reference; and
initiating the building action when the first distance is shorter than or equal to a specified minimum distance.

6. The method according to claim 5 wherein the receiving device receives a third radio signal transmitted by a second mobile electronic device of a second user, and including determining a third channel impulse response based on the third radio signal received by the receiving device, evaluating the third channel impulse response in conjunction with the first channel impulse response to ascertain a second distance of the second mobile electronic device to the transmitting device and initiating another building action when the second distance is shorter than or equal to the specified minimum distance.

7. The method according to claim 6 including when one of the first and second distances is shorter than or equal to the specified minimum distance, determining another degree of similarity based on the first and second channel impulse responses, ascertaining an inter-user distance between the first and second mobile electronic devices and initiating a safety measure when the inter-user distance is shorter than or equal to a specified inter-user distance.

8. The method according to claim 6 including the steps of:
evaluating a third channel impulse response based on a fourth radio signal transmitted by a third mobile electronic device of a third user, the evaluating including calculating degrees of similarity in pairs in order to ascertain pair distances between each pair of the first, second and third mobile electronic devices;
comparing the pair distances with a specified inter-user distance; and
assigning the first, second and third users to a single group when the first, second and third mobile electronic devices are each at a distance from one another that is shorter than or equal to a specified inter-user distance.

9. The method according to claim 4 wherein the first radio signal and the second radio signal have no common time reference, the method further including the steps of:
ascertaining a first distance of the first mobile electronic device of the first user from the transmitting device according to a formula $d_1 = E_A \cdot c/2 \cdot SD_A$ where $E_A = (K+1)/(K-1)$ a correction factor with K being a number of the multipath signal components, c is the speed of light, and $SD_A$ is the maximum time deviation minus the minimum time deviation with no common time reference; and
initiating the building action when the first distance is shorter than or equal to a specified minimum distance.

10. The method according to claim 9 wherein the receiving device receives a third radio signal transmitted by a second mobile electronic device of a second user, and including determining a third channel impulse response based on the third radio signal received by the receiving device, evaluating the third channel impulse response in conjunction with the first channel impulse response to ascertain a second distance of the second mobile electronic device to the transmitting device and initiating another building action when the second distance is shorter than or equal to the specified minimum distance.

11. The method according to claim 10 including when one of the first and second distances is shorter than or equal to the specified minimum distance, determining a second degree of similarity based on the first and second channel impulse responses, ascertaining an inter-user distance between the first and second mobile electronic devices and initiating a safety measure when the inter-user distance is shorter than or equal to a specified inter-user distance.

12. The method according to claim 10 including the steps of:
evaluating a third channel impulse response based on a fourth radio signal transmitted by a third mobile electronic device of a third user, the evaluation including calculating degrees of similarity in pairs in order to ascertain pair distances between each pair of the first, second and third mobile electronic devices;
comparing the pair distances with a specified inter-user distance; and
assigning the first, second and third users to a single group when the first, second and third mobile electronic devices are each at a distance from one another that is shorter than or equal to the specified inter-user distance.

13. The method according to claim 1 including a storage device in the signal processing device, the storage device storing a measurement database and a computer program, and including the steps of:

storing in the measurement database a data set determined in a training phase, the data set comprising a plurality of measured distances of a mobile electronic device from the transmitting device and channel impulse responses measured for each of the measured distances;

wherein the computer program, when executed by a processor, performs a machine learning algorithm in the training phase in order to ascertain a function from the data set which maps the measured channel impulse responses to the measured distances; and applying the function ascertained in the training phase to the first and second channel impulse responses to ascertain therefrom a distance between the first mobile electronic device and the transmitting device.

14. A system for controlling an access to an access-restricted zone in a building, the system comprising:

a stationary transmitting device transmitting a first radio signal;

a receiving device for receiving radio signals;

a control device;

a signal processing device communicatively connected to the receiving device and the control device;

wherein the signal processing device is adapted to
  determine a first channel impulse response based on the first radio signal received by the receiving device,
  determine a second channel impulse response based on a second radio signal received by the receiving device, the second radio signal being transmitted from a first mobile electronic device of a first user, and
  determine a degree of similarity by evaluating the first channel impulse response and the second channel impulse response, the degree of similarity indicating how similar the first channel impulse response and the second channel impulse response are to each other;

wherein the control device is adapted to initiate a building action in the building when a specified rule is met based on the degree of similarity; and wherein the first and second radio signals have a bandwidth of at least 500 MHz and are transmitted and received according to a WLAN/WiFi standard or a standard for ultra-broadband technology.

15. The system according to claim 14 wherein the signal processing device is adapted to:

determine a first sequence of temporally successive first multipath signal components from the first channel impulse response;

determine a second sequence of temporally successive second multipath signal components from the second channel impulse response; and perform the evaluating of the first and second channel impulse responses by comparing in pairs, according to an order in the first and second sequences, each of the second multipath signal components with a corresponding one of the first multipath signal components to determine a time deviation for each of the pairs to a maximum time deviation and a minimum time deviation, the degree of similarity being based on one of the maximum and minimum time deviations.

16. The system according to claim 15 wherein the first radio signal and the second radio signal have a common time reference, the signal processing device being adapted to determine a first distance of the first mobile device of the first user from the transmitting device according to a formula $d_1 = E_S \cdot c \cdot SD_S$ where $E_S = (K+1)/K$ is a correction factor with K being a number of the multipath signal components, c is the speed of light, and $SD_S$ is the maximum time deviation and to initiate the building action when the first distance is shorter than or equal to a specified minimum distance.

17. The system according to claim 15 wherein the first radio signal and the second radio signal have no common time reference, the signal processing device being adapted to ascertain a first distance of the first mobile device of the first user from the transmitting device according to a formula $d_1 = E_A \cdot c/2 \cdot SD_A$ where $E_A = (K+1)/(K-1)$ is a correction factor with K being a number of the multipath signal components, c is the speed of light, and $SD_A$ is the maximum time deviation minus the minimum time deviation and to initiate the building action when the first distance is shorter than or equal to a specified minimum distance.

* * * * *